United States Patent
Rank

[15] 3,648,669
[45] Mar. 14, 1972

[54] FUEL INJECTOR AND IGNITER

[72] Inventor: William J. Rank, 1704 East 58th St., Minneapolis, Minn. 55417

[22] Filed: May 28, 1970

[21] Appl. No.: 41,320

[52] U.S. Cl..................123/32 AH, 123/32 AJ, 123/145 A, 123/169 V
[51] Int. Cl...........................................F02b 3/02
[58] Field of Search............123/32, 32 JV, 32 SJ, 30 C, 123/145 A, 139, 139 AC, 139 AP

[56] References Cited

UNITED STATES PATENTS

| | | | |
|---|---|---|---|
| 1,223,124 | 4/1917 | Thompson | 123/32 SJ |
| 1,641,421 | 9/1927 | French | 123/145 A |
| 1,780,499 | 11/1930 | Novelli | 123/145 A |
| 2,255,203 | 9/1941 | Wiegand | 123/32 SJ |
| 3,017,541 | 1/1962 | Lawser | 123/145 A |
| 2,090,428 | 8/1937 | Schneider | 123/139 AC |
| 1,402,408 | 1/1922 | Firebaugh | 123/139 AP |
| 2,910,696 | 10/1959 | Heiser | 123/139 AP |

Primary Examiner—Laurence M. Goodridge
Attorney—Donald R. Sjostrom

[57] ABSTRACT

An internal combustion engine with a nozzle for injecting fuel into the cylinder under pressure and across a heater which ignites the fuel as it enters the cylinder. A variable volume pump with a unique control means for varying the volume provides fuel to the injector nozzle. The nozzle is arranged, and the heater is so disposed with respect thereto, that substantially all of the fuel injecting by the nozzle is ignited by the heater as it enters the cylinder.

18 Claims, 6 Drawing Figures

Patented March 14, 1972 3,648,669
2 Sheets-Sheet 2
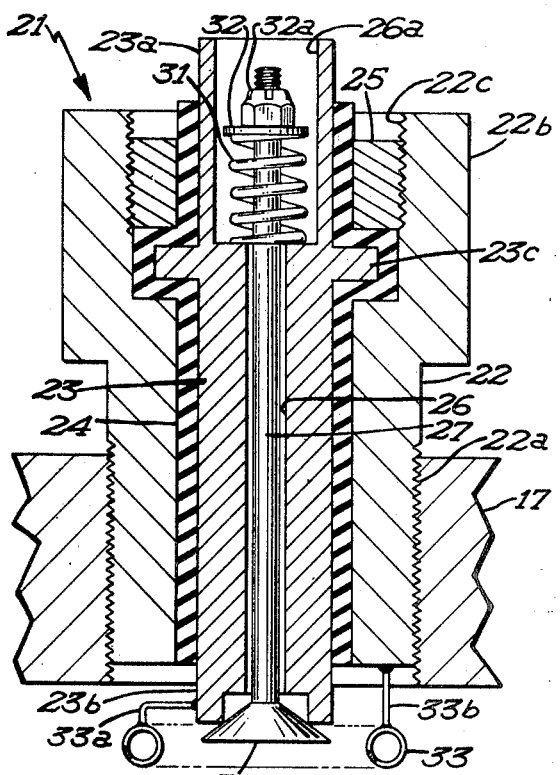
Fig 2
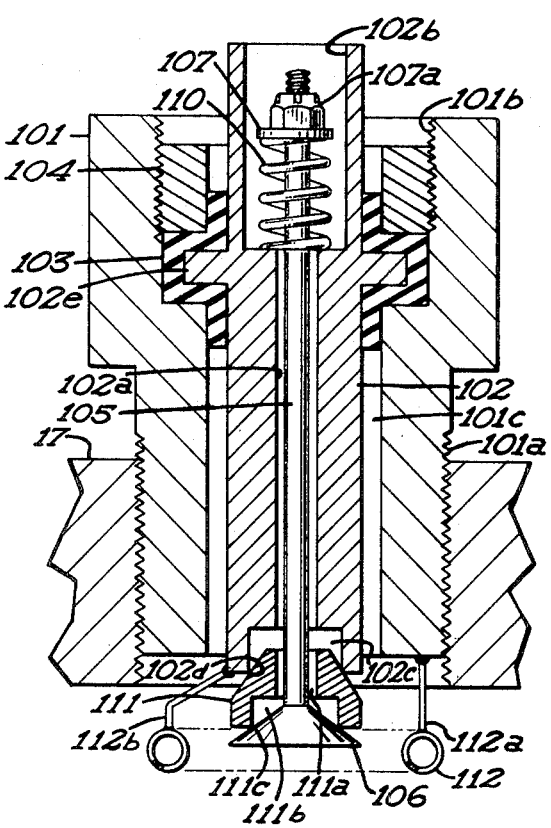
Fig 3
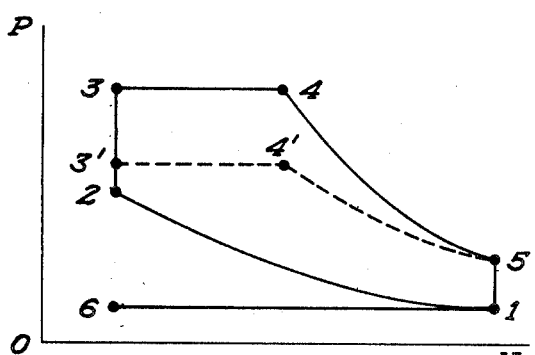
Fig 4
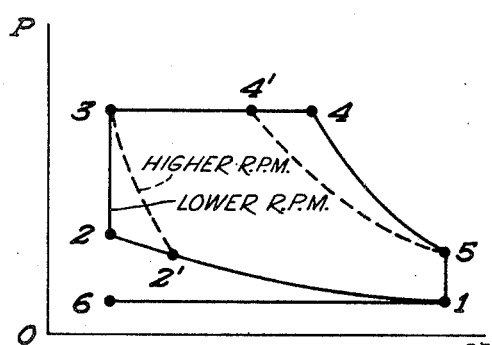
Fig 5
INVENTOR.
WILLIAM J. RANK
ATTORNEY

FUEL INJECTOR AND IGNITER

BACKGROUND OF THE INVENTION

There are two basic types of internal combustion piston engines. One of these is the Otto cycle wherein a mixture of fuel and air is drawn into a cylinder, is compressed and is then ignited by a spark plug with the resulting explosion or combustion of the fuel driving the piston to expand the chamber and to do work. The other common cycle is the Diesel cycle wherein air is compressed to a relatively high pressure and fuel is injected into the cylinder after the compression is substantially completed and ignites due to the temperature and pressure of the air into which it is injected.

Many variations of these basic cycles and many methods of improving their efficiency have been proposed. It is desired to improve this efficiency not only for economic reasons but also in order to assure substantially complete combustion and reduce the amount of unburned fuel which is exhausted by the engine as a potential air or water pollutant. Various additives for fuels have been used as have various means for controlling the injection and combustion of fuel. It has been proposed to have the fuel injected into the chamber through a spark gap, for example, in an effort to improve combustion. Various types of spark plugs and fuel injecting mechanisms have been proposed. Recently there has been proposed an engine which has a specially designed cylinder or piston to provide a special precombustion gas chamber with a glow wire disposed in it. This arrangement was proposed primarily for natural gas engines and required substantial modification of the engine.

In spite of the efforts to improve internal combustion engines, it is a well-known fact that there remains room for a great deal of improvement. This invention provides a n improved apparatus and method for controlling combustion in an internal combustion engine.

BRIEF SUMMARY OF INVENTION

This invention provides a unique method for controlling the combustion in the cylinder of an internal combustion engine in order to provide more complete combustion for the sake of economy and in order to reduce the amount of unburned fuel which is exhausted by the engine. In addition, it provides unique apparatus for carrying out the inventive method. The invention is adaptable to conventional engines without modification of the piston or cylinder and is usable with conventional fuels such as gasoline. The method comprises the steps of compressing air alone in the combustion chamber, thereafter injecting fuel under pressure into the chamber through a nozzle which causes the fuel to be injected as a spray, and passing the fuel over a heated element which is heated at least to the ignition temperature of the fuel at the pressure then existing in the combustion chamber so that substantially all of the fuel is ignited as it leaves the nozzle. As a result of the combustion of the fuel, the chamber is expanded to do work and finally the products of combustion are exhausted from the chamber. The apparatus for carrying out this method includes a member providing a fuel injecting nozzle for injecting the fuel as a spray and including a heater disposed so that the spray is substantially all ignited as it enters the combustion chamber. Preferably the heater is electrically energized and is generally toroidal in shape and coaxial with the opening in the nozzle which preferably is annular. The control system preferably includes a pump which is operated in synchronism with the engine and which pressurizes fuel and supplies it to the nozzle which has incorporated therein a pressure operated valve which is opened by the pressurized fuel so that the fuel is injected at a desired and substantially constant pressure. The pump may be driven by the engine itself and preferably is constructed so it operates at a fixed rate with respect to the engine. The amount of fuel provided to the combustion chamber is controlled by varying the volume of the pump which in turn is dependent upon the stroke of a piston in the pump. The phase of the pump with respect to the engine may be varied with engine speed so that fuel injection, and thereby combustion, takes place at a predetermined point in the combustion cycle dependent upon r.p.m. of the engine. In the preferred arrangement the reciprocating piston of the pump is operated by a pivoted lever member which is moved about a fulcrum by a cam means which in turn is driven by the engine. The pivot point for the lever member is preferably movable between its point of engagement with the piston of the pump and its point of engagement with the cam. The stroke is controlled by moving the fulcrum or pivot point between these two members to change the relative lever arms between the pivot point and these two members.

The phase of the pump with respect to the engine may be varied by means of a planetary gearing arrangement and with a pressure responsive means, powered by a gear pump driven by the engine and responsive to its speed, connected to the planet gear to change the phase relationship between the input and output in response to changes in engine speed.

In one embodiment of the invention the injector nozzle includes valve means providing two concentric annular openings for injecting fuel and designed so that they open substantially simultaneously and so that fuel issued therefrom converges and intersects substantially at the position of an annular heater which ignites the fuel.

An object of the invention is to provide an improved method for controlling combustion in an internal combustion engine.

Another object of the invention is to provide a method as aforesaid wherein fuel is injected as a spray under pressure into the combustion chamber after the air has been compressed, and the fuel is passed over a heater element which ignites substantially all of the fuel as it enters the chamber.

Another object of the invention is to provide apparatus for carrying out the aforesaid method, which apparatus is adaptable to conventional engines and is usable with conventoinal fuels.

Another object of the invention is to provide a control system including a pump for providing fuel under pressure, a nozzle for injecting it into a combustion chamber after air has been compressed therein and for passing the fuel over a heater element which ignites the fuel as it enters the chamber.

Another object of the invention is to provide a system as aforesaid wherein throttling is accomplished by varying only the amount of fuel which is injected into the combustion chamber while the amount of air remains substantially constant.

Another object is to provide a control system as aforesaid wherein substantially all the fuel is ignited as it enters the chamber thereby substantially eliminating the likelihood of detonation of the fuel and eliminating the need for additives such as tetraethylead to retard such detonation.

Another object is to provide a variable volume piston-type pump with improved means for varying the stroke of the piston to thereby vary the volume of material moved by the pump.

Another object is to provide a control as aforesaid including means for controlling the phase (the point in the engine cycle) at which combustion begins.

These and other objects of the invention will become apparent upon reading the detailed description of the invention which follows and wherein reference is made to the drawing.

DESCRIPTION OF DRAWING

FIG. 1A is a schematic showing in cross section, taken generally along line 1A—1A of FIG. 1 and showing a phase changing means which forms a part of the invention.

FIG. 2 is a longitudinal cross-sectional view of an injector nozzle apparatus which is utilized in the control system of FIG. 1.

FIG. 3 is a modified form of the injector nozzle means.

FIG. 4 is a graphical representation of the cycle through which the engine of FIG. 1 operates when it is controlled in accordance with the present invention and disclosing a theoretical cycle with throttling at constant r.p.m. and constant phase.

FIG. 5 is a similar graphical presentation of a theoretical cycle with combustion phase change at constant throttle.

DETAILED DESCRIPTION

Figure 1:
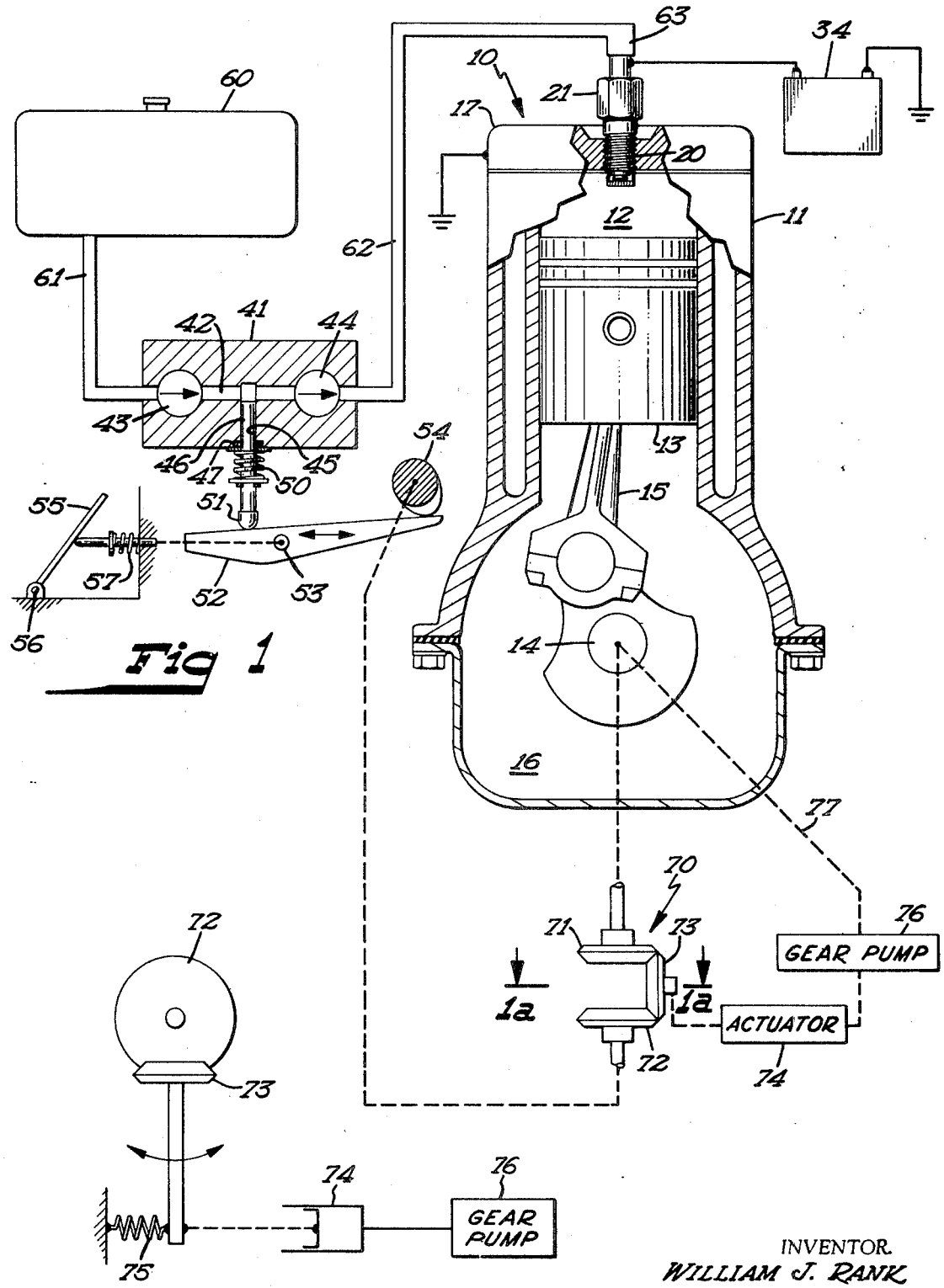
FIG. 1 is a schematic representation of an internal combustion engine and a control system therefor utilizing the method and combination of this invention.

Referring to the drawing, numeral 10 generally designates an internal combustion engine of the piston type, shown schematically as a single cylinder engine having a block 11 with a bore 12 or cylinder in which a piston 13 reciprocates. Piston 13 is connected to a crankshaft 14 by a connecting rod 15. Crankshaft 14 is disposed in a crank case 16 at the lower end of the engine. At the upper end of the engine a heat 17 encloses the end of bore 12 and has a port 20 threaded to accept a spark plug or the like. As indicated, engine 10 is shown schematically for purposes of illustration. No valves for admitting air or exhausting the products of combustion have been shown but it will be appreciated that some type of valving or porting arrangement must be provided for this purpose.

Instead of a spark plug being threaded into port 20, an injector means 21 is inserted there. Injector means 21 is shown in enlarged cross section in FIG. 2. As seen there, injector means 21 includes a main body member 22 which is substantially cylindrical and which has a lower threaded portion 22a which threads into port 20 of the engine. At the upper end, member 22 has an enlarged hexagonal portion 22b adapted to be disposed outwardly from the head of the engine and constructed so that a wrench may be applied to it in order to tighten member 22 when it is inserted into the spark plug port. Member 22 is hollow with a longitudinally extending cylindrical opening therein. Adjacent the upper end, in the enlarged portion 22b, it has an internally threaded portion 22c. Disposed within the opening in member 22 is another cylindrical member 23 which extends all the way through member 22 and has an upper portion 23a extending outwardly at the upper end and a lower or nozzle portion 23b extending beyond member 22 at the inner end. Near the upper end of member 23, and disposed within portion 22c of member 22, is an outwardly extending annular flange 23c. Disposed between member 22 and member 23 is a sleeve 24 constructed of electrically insulative material so that members 22 and 23 are electrically insulated from each other. When member 23 is disposed within member 22, it is held in place by an externally threaded nut 25 which is threaded into portion 22c of member 22 and down against annular flange 23c of member 23 so that the two members are rigidly held together.

Member 23 is also hollow with an axially extending cylindrical opening extending all the way through it. This opening is identified by the numeral 26 and near the upper end 23a of member 23, it is enlarged so as to provide a larger cylindrical opening 26a. Extending through opening 26 is a stem or spindle 27 which fits loosely within opening 26. At its lower end 23b, member 23 is formed with a valve seat which cooperates with a valve 30 which is fixed to the end of stem 27. The upper end of stem 27 is disposed within the enlarged cylindrical opening 26a. A coil spring 31 is disposed within opening 26a and encircles stem 27. The lower end of spring 31 rests against the shoulder formed by member 23 at the bottom of opening 26a. The upper end of the spring abuts a nut 32 which is threaded onto the upper end of stem 27. Spring 31 urges stem 27 in an upwardly direction and urges valve member 30 into engagement with the valve seat 23b.

A toroidal electric heater 33 has an electrical lead 33a connected to member 23 and another electrical lead 33b connected to member 22. Toroidal heater 33 is arranged generally coaxial with the opening in member 23 and thus coaxially with the valve seat and with valve 30. It is spaced somewhat from the valve and is disposed in a position so that as the valve moves away from the valve seat, opening an annular nozzle between the valve and seat, the spray issuing therefrom impinges upon the heater. This will be described in more detail hereinafter.

It will be appreciated that when injector means 21 is threaded into port 20, body member 22 will be connected to head 17 of the engine which in turn is grounded. Member 23 is connected to one side of a power source 34 such as a battery, which has its other terminal grounded.

A fuel pump 40 is also shown schematically in FIG. 1. Pump 40 includes a body 41 having a fluid passage 42 therethrough. At one end this passage has an inlet check valve 43 and at the other end an outlet check valve 44. These check valves may be of any conventional design, it being essential only that valve 43 permits the flow of fluid into the fluid passage in the pump but will not permit it to flow in the opposite direction out of the passage while valve 44 acts in an opposite direction, permitting fuel to egress from said passage only. Disposed in a passage or bore 45 in housing 41 which extends generally transversely to passage 42 and intersects passage 42 in between valves 43 and 44, is a pump piston 46 which is reciprocable in passage 45. Piston 46 is sealed with respect to passage 45 by appropriate means such as a sealing ring 47 and is urged in a direction outwardly from passage 45 by appropriate means such as a spring 50. The outer end of piston 46 is provided with an appropriately shaped end 51 which engages a lever arm 52. Lever arm 52 is pivoted about a fulcrum 53 and is also operably engaged by an eccentric cam 54 which is connected to crank shaft 14 of the engine by appropriate means which have been shown schematically. This may be a direct connection whereby the cam always has a fixed phase with respect to the crankshaft or may include means for varying the phase between the crankshaft and the cam in response to engine speed as will be described hereinafter. Fulcrum 53 is disposed between the points of engagement of lever 52 by piston 51 and by cam 54 and is movable between them by operation of an appropriate control device such as a foot or hand-operated throttle member 55. Member 55 may be pivoted about a pivot 56 and urged to a predetermined position by a spring 57. In the embodiment disclosed, throttle member 55 is urged in a counterclockwise direction to an end position and may be moved in an opposite direction to move fulcrum 53 between piston 46 and cam 54. Movement of fulcrum 53 varies the relative lengths of the lever arm between the fulcrum and the piston and between the fulcrum and the cam and thus varies the stroke of the piston as the cam rotates. It will be appreciated that the cam will always move the lever arm a predetermined amount during each revolution of the cam. The amount of movement of the piston will depend upon the lever arm between it and the fulcrum. Therefore, the amount of fuel provided to the combustion chamber during each cycle is dependent upon the position of throttle member 55 and fulcrum 53 controlled thereby. It will be seen that if the pump was designed so that fulcrum 53 could be moved to a position directly beneath piston 46 there would be substantially no displacement of piston 46 in that position.

Fuel is stored in an appropriate fuel tank 60 and is conveyed therefrom to inlet valve 43 by a fuel line 61. Similarly, fuel is conveyed from outlet check valve 44 by a fuel line 62 which includes a coupling means 63 adapted to engage the upper end 23a of member 23 to provide a fuel-tight connection so that fuel is provided by the pump to injector means 21.

The fuel in tank 60 is preferably a liquid such as gasoline and is substantially uncompressible. Thus, operation of pump 40 does not compress the fuel any substantial amount but simply displaces and pressurizes it and thus causes it to exert a pressure upon the inner surface of valve member 30. When a predetermined pressure is exerted against this valve member, sufficient to overcome the force applied by spring 31 and the pressure exerted on the outer side of the valve by the compressed air in the combustion chamber, the valve moves open allowing the fuel to be sprayed into the combustion chamber. Valve seat 23b and valve 30 are constructed so that the fuel will be emitted substantially as a spray and will be directed so that substantially all of it will engage and be ignited by heater 33. It will be appreciated that actually there is some compression of the liquid fuel so that the operation of pump 40 is not completely one of simple displacement. However, this assumption has been made for the purposes of this illustration and, if this is the case, the pressure of the fuel supplied by pump 40 will be substantially the same regardless of the volume. Thus, the opening of valve 30 and the injection of fuel into the combustion chamber will be dependent not upon the volume of fuel but simply upon the pressure.

As indicated the connection between crankshaft 14 and cam 54 may be fixed so that the same phase relationship always exists between them. In many instances, however, it will be desirable to vary this phase relationship (and thus the point in the engine cycle where fuel injection and combustion takes place) in response to the speed of the engine. This may be accomplished by interposing in the connection between crankshaft 14 and cam 54 a planetary gearing arrangement 70 including an input gear 71 driven by the crankshaft, an output gear 72 driving cam 54, and an intermediate planer gear 73. Gears 71 and 72 are bevel gears arranged coaxially. Gear 73 is also a bevel gear with its axis normal to the axes of gears 71 and 72 and movable in an arc about the axes of gears 71 and 72. When the axis of gear 73 remains stationary, the phase between input and output gears 71 and 72 is constant. Movement of the axis of gear 73 will change this phase relationship and thus the point in the engine cycle at which pump piston 46 will be operated to inject fuel into the engine. The positioning of gear 73 may be accomplished by a pressure operated piston 74 acting against a biasing spring 75. Pressurized fluid is provided to piston 74 by a gear pump 76 which is driven by the engine as through appropriate means 77 shown schematically in FIG. 1. Pump 76 is constructed so that its output pressure is dependent upon its speed which in turn depends upon the speed of the engine. As the engine speed increases the pressure increases moving piston 74 against spring 75, thus moving gear 73.

The operation of the device and the method set forth in connection with this invention can best be seen by also referring to FIGS. 4 and 5 which graphically disclose a pressure-volume diagram illustrating the operation of an engine controlled in accordance with this invention. FIG. 4 discloses a theoretical cycle and the effect of throttling at constant engine speed. The cycle begins at point 1 on the diagram with piston 13 retracted so that the cylinder is at a maximum volume and is filled with air. The piston then moves upwardly and the air is compressed in the chamber. At point 2 on the cycle, the piston is at a position of substantially maximum compression or minimum volume. At this point no fuel has been injected into the combustion chamber. However, pump 40 has been pressurizing fuel and substantially at point 2 sufficient pressure is applied to open valve 30 so that fuel is sprayed into the combustion chamber and across heater 33. Heater 33 is substantially constantly energized to a temperature so that it will ignite fuel as it is sprayed into the chamber. This results in an almost immediate increase in temperature (and consequently pressure) in the chamber, raising the pressure to point 3 without substantial change in the volume of the combustion chamber. As the crankshaft moves overcenter, the combustion chamber is expanded and fuel continues to be injected at substantially a constant pressure within the chamber as the piston moves away and does work. The injection of fuel ceases substantially at point 4 and the piston continues to move to point 5 so that the volume of the chamber increases and the pressure decreases until it reaches the point of maximum volume at point %. At point 5 the exhaust valve opens and the products of combustion are exhausted. The pressure thus drops bringing the system substantially to point 1. The exhaust valve remains open through one additional cycle of the engine between point 1 and point 6 which occurs at substantially constant pressure. During movement from point 1 to point 6 the products of combustion are exhausted from the combustion chamber and as the piston moves from point 6 to point 1, a fresh air charge is drawn into the cylinder and the entire cycle is repeated. If it is desired to throttle the engine as to decrease the work output, the amount of air remains the same and the throttling is accomplished by simply changing the amount of fuel which is injected. In this case the cycle will be modified in that it will follow substantially the points 3 and 4 . Thus, the amount of heat necessary to do the required amount of work is varied by varying the amount of fuel injected. Both the maximum temperature and the maximum pressure are maintained as low as possible and substantially complete combustion is assured. 5. there is detonation and because substantially all of the fuel is ignited as it enters the chamber, there is no need for additives such as tetraethylead. Because of the complete or substantially complete combustion provided, the amount of fuel utilized will be less for an equal amount of work and the products of combustion will be substantially less, thus decreasing the potential air or water pollution by the operation of the engine.

In FIG. 5 a similar diagram discloses a change in r.p.m. and in the combustion phase (position in the cycle at which fuel injection and combustion take place) but at constant throttle. This situation may occur when a change in load occurs. Here the same quantity of fuel is injected during each cycle but the phase changes with the speed so that combustion begins earlier at higher speeds. For example, at a given speed injection, and combustion, may begin at point 2 (in FIG. 5) which is substantially at the point of maximum compression and combustion takes place substantially at constant volume until injection ceases at point 3. At a greater speed, the phase is changed so that injection begins earlier in the cycle at point 2 and continues as the piston passes through the point of maximum compression at 3 and terminates at a point 4 which may be beyond the overcenter position. The phase will be varied so that combustion begins as close as possible to an optimum point at each speed.

It will be appreciated that under normal conditions the throttling and the r.p.m. will be changing simultaneously. Then the resulting combustion cycle would be a combination of FIGS. 4 and 5 and becomes extremely complex. Thus these changes have been described separately for the sake of clarity.

FIG. 3 discloses a modified fuel injection means which may be substituted for means 21 described above. This fuel injection means, generally designated by the numeral 100, includes a main body portion 101 which has a threaded portion 101a adapted to be threaded into a spark plug port in the engine head. At its outer end body member 101 has an enlarged portion having an internally threaded opening 101b. Member 101 is hollow with a central, axially extending, opening 101c therethrough. Disposed within opening 101c is another generally cylindrical member 102 having a longitudinal opening 102a extending therethrough. Adjacent its upper end member 102 has an enlarged cylindrical opening 102b which may be adapted for connection to a fuel line as was the upper end of member 21 described in connection with FIG. 2. At its lower end, member 102 also has an enlarged cylindrical opening 102c which terminates in an annular edge 102d which serves as an annular valve seat. Member 102 also has a radially extending flange 102e which is disposed within opening 101b. An electrically insulating sleeve member 103 encircles at least a portion of member 102, including flange 102e and is thus disposed between members 101 and 102 so that they are electrically insulated from each other. Members 101 and 102 are each electrically conductive. Members 101 and 102 are held rigidly assembled by threading into threaded portion 101b an externally threaded nut 104 which engages the upper surface of flange 102e through the overlying sleeve 103.

Disposed within opening 102a is a longitudinally extending valve stem 105 which carries at its lower end an enlarged valve closure member 106. Stem 105 fits loosely into opening 102a so there is a substantial fuel passage around the stem. At its upper end, and disposed within the cylindrical opening 102b in member 102, stem 105 has a radially extending nut 107 engaging the upper end of a compression spring 110, the lower end of which engages the upper surface of member 102 at the bottom of opening 102b. Spring 110 urges valve stem 105 in an upwardly direction thus urging valve member 106 towards the valve seat.

Disposed between valve member 106 and seat 102d is a generally conical washer member 111 which also has a central opening 111a large enough so that washer 111 fits loosely upon stem 105 and provides a fuel passage around the stem. At its lower end water 111 is formed with an enlarged cylindrical opening 111b which terminates in an annular valve seat 111c disposed to be engaged by the upper surface of valve member 106 which is also generally conical in shape.

The apparatus is constructed so that valve stem 105 and valve seats 102d and 111c are generally coaxial. Also, annular valve seats 102d and 111c have substantially the same radius. While the valve closure surfaces of washer 111 and of valve portion member 106 are both generally conical, they are formed with dissimilar angles. It has been determined that as the valve moves away from its seat, the spray of fuel issuing therefrom substantially bisects the angle between the surface of the valve closure member and the face of the valve seat. The angle of the conical surfaces of members 106 and 111 have been chosen so that the fuel issuing from these two openings, when both the washer and the valve are moved away from their seats, will intersect in an annular area generally coaxial with the valve and the washer and spaced a small distance therefrom. Disposed at substantially the point where these two sprays will intersect, is a toroidal electrically energizable heater 112 which has one electrical lead 112a connected to member 101 and another electrical lead 112b connected to member 102 which in turn may be connected to a source of electrical current generally in the same manner as described in connection with the embodiment of FIG. 2.

Spring 110 normally urges valve closure member 106 into sealing engagement with seat 111c and at the same time urges washer 111 into sealing engagement with seat 102d. As the pressure acting upon the upper sides of valve member 106 and washer 111 reaches a point sufficient to overcome the force of spring 110 and the pressure acting on the washer and valve closure member from the combustion chamber, both the washer and the closure member move away from their seats. With the annular valve seats substantially equal in radius, the structure may be constructed so that the valve closure member will move away from its seat at substantially the same time as the washer moves away from its seat on member 102 so that there actually are two annular nozzle openings both issuing fuel at substantially the same time. Because of the shape of the conical surfaces of the valve closure member and washer, the spray of fuel issuing from these nozzle openings converge substantially at the heater. This heater is heated by the electrical current to a temperature sufficient to ignite substantially all of the fuel issuing from the nozzle opening and igniting it as it enters the combustion chamber.

With the structure and method described, a conventional internal combustion engine can be rendered more efficient, the potential air or water pollutents expelled thereby reduced, and the need for at least some of the additives normally utilized in its fuel eliminated. Preferably the apparatus includes a fuel injecting and igniting means which may be inserted into the conventional spark plug port without modification of the engine. Two variations of this fuel injecting and igniting means have been disclosed but various other modifications may also be made. A unique fuel pumping arrangement has also been disclosed in connection with the control system and method of the invention. While this pump is particularly adapted for use with the improved system and method, certain other pumps may also be utilized. A phase changing means, varying the point at which combustion begins in accordance with engine speed has been disclosed. A four-cycle engine has been described but it will be obvious that the same system and apparatus may be applied to a two-cycle engine if desired. While the pump has been shown located remotely from the injection means, it will be appreciated that it may be incorporated into the injection means which then will be somewhat larger and will require a mechanical connection to a driving means such as the cam. These and various other modifications may become apparent to those skilled in the art in view of the disclosure herein. It is to be understood that the disclosure here is by way of example only and not of limitation, and that this invention is to be limited solely by the scope of the appended claims.

The embodiment of the invention in which an exclusive property or right is claimed are defined as follows:

1. Fuel injecting and igniting means for use with an internal combustion engine having a combustion chamber comprising a body member having a portion adapted for connection to an internal combustion engine and a longitudinal passage with an interior end open to the combustion chamber, a cylindrical member located within said passage, said cylindrical member having outwardly directed flange means and means providing a fuel passage through said cylindrical member and including means for connection to a source of pressurized fuel on the exterior of the combustion chamber, electrically nonconductive means located between the cylindrical member and the body member around said flange means to electrically insulate the cylindrical member from the body member, means connected to the body member and engageable with the electrically nonconductive means around the flange means to hold the cylindrical member in assembled relation with the body member, and nozzle means for discharging the pressurized fuel as a spray into the combustion chamber, said nozzle means having a valve means operable to open and close the interior end of the passage to sequentially discharge fuel into said combustion chamber, heater means disposed in a relatively close proximity to said nozzle means and in the path of fuel discharged from the nozzle means, and said heater means being adapted to be heated to a temperature sufficient to ignite fuel passed thereover.

2. Combination of claim 1 wherein the nozzle means has a generally annular discharge opening and the heater means is generally circular in shape, is generally coaxial with the annular opening in said nozzle means, and is disposed in a position so that it is in the path of fuel injected into the combustion chamber from the nozzle means.

3. The combination of claim 2 wherein said heater means comprises a generally toroidal, electrically energizable, heater element made up of a coiled ignition wire adapted to be continuously energized during operation of an internal combustion engine with which it is used.

4. The combination of claim 1 wherein the valve means includes an annular valve seat at the interior end of said cylindrical member around the opening therein, a valve closure member movable toward and away from said seat, means resiliently urging said closure member toward said seat, and means rendering said closure member responsive to a predetermined fuel pressure in said tubular member and movable thereby to open the passage in the cylindrical member to the combustion chamber.

5. Fuel injecting and igniting means for use with an internal combustion engine comprising: a body member adapted for connection into a combustion chamber in an internal combustion engine, means providing a fuel passage through said body member and including means for connection to a source of pressurized fuel on the exterior of the combustion chamber, nozzle means for discharging the pressurized fuel as a spray on the interior of the combustion chamber, said nozzle means including means providing two generally annular, coaxial, discharge openings, heater means disposed in a relatively close proximity to said nozzle means and in the path of the fuel discharged by said nozzle means, said heater means having a generally annular heater element arranged generally coaxially with said discharge openings and spaced therefrom, and said means providing the discharge openings are constructed and arranged so that the jet streams discharged therefrom converge and intersect substantially at the heater element whereby the fuel is ignited by said element as it enters the combustion chamber.

6. The combination of claim 5 wherein the nozzle means comprises a stem disposed in the fuel passage through the body member, a valve seat on said body member at the interior end of said fuel passage therethrough and encircling said stem, a valve member carried by said stem inside the combustion chamber, a washer member loosely carried on said stem intermediate said valve seat and said valve member, the washer member being made of a material which is substantially softer than the seat and the valve member, means resiliently urging said stem in a direction so that said valve member engages said washer which in turn engages said valve seat to seal the fuel passage, and said stem being movable in an opposite direction to move said valve away from said seat so that an annular opening is formed between the valve seat and the washer and a second opening is formed between the washer and the valve member.

7. The combination of claim 6 wherein said washer and said valve member each have a generally conical shape but with dissimilar slopes selected so that the annular jet streams discharged therefrom converge substantially at the heater means which is disposed a relatively short distance from the nozzle means.

8. The combination of claim 6 wherein said body member is adapted to be threaded into a spark plug port in the combustion chamber, said heater means is electrically energizable, and the combination further includes means for connecting said heater means to an electrical powered source.

9. The combination of claim 5 wherein: said heater means comprises a generally toroidal, electrically energizable heater element made up of a coiled ignition wire adapted to be continuously energized during operation of the internal combustion engine with which it is used.

10. The combination of claim 5 wherein: said body member comprises a hollow, generally cylindrical member having a threaded portion adapted to be threaded into the spark plug port of an internal combustion engine, said body member being electrically conductive whereby it is grounded to the engine when it is threaded into the spark plug port, an electrically conductive, generally tubular member disposed in the opening in said hollow member and providing a relatively high pressure seal therebetween, said connecting means further electrically insulating said tubular member from said body member, said tubular member being adapted for connection to a source of fuel under pressure on the exterior of the combustion chamber, said nozzle means being located at the interior end of said tubular means.

11. The combination of claim 5 wherein: the means of said nozzle means is a valve means having a stem and a closure member, said stem being located in said passage and annular means loosely carried on said stem between the body member and the closure member, said annular member engageable with said body member and the closure member to close the end of the passage.

12. The combination of claim 11 wherein: said annular means is a washer made of material which is substantially softer than the material of the body member.

13. The combination of claim 12 wherein: said annular means and closure member each have a generally conical shape with dissimilar slopes, said slopes selected so that the annular jet streams discharged therefrom converge substantially at the heater means which is disposed a relatively short distance from the nozzle means.

14. Fuel injection means for use with an internal combustion engine having a combustion chamber comprising: tubular means adapted for connection to an internal combustion engine, said tubular means having a passage with an end adapted to be in communication with the combustion chamber, valve seat on the tubular means around said end, valve means operable to open and close the end of the passage, said valve means having a stem and a closure member, said stem being located in said passage, means urging the closure member toward the seat means, washer means loosely carried on said stem between said valve seat means and closure member, said washer means engageable with the seat means and closure members to close the end of the passage.

15. The combination of claim 14 wherein: said valve closure member and said washer each have a generally conical shape with dissimilar slopes, said slopes selected so that the annular jet streams of fuel discharged therefrom converge toward each other.

16. The combination of claim 14 wherein: said washer means is made of material which is substantially softer than the seat means and the closure member.

17. The combination of claim 14 wherein: the means urging the closure member toward the seat means comprises a biasing means acting on the valve stem to bias the closure member and washer means to the closed position.

18. The combination of claim 14 including: a body member adapted to be threaded into the spark plug port of an internal combustion engine and means connecting the tubular means to said body member.

* * * * *

PO-1050
(5/69)

UNITED STATES PATENT OFFICE
CERTIFICATE OF CORRECTION

Patent No. 3,648,669          Dated March 14, 1972

Inventor(s) William J. Rank

It is certified that error appears in the above-identified patent and that said Letters Patent are hereby corrected as shown below:

```
Abstract, line 7, "injecting" should be --injected--.
Column 3, line 16, "heat" should be --head--.
Column 5, line 19, "planer" should be --planet--.
Column 5, line 67, "%" should be --5--.
Column 6, line 5, "3 and 4" should be --3' and 4'--.
Column 6, line 10, "5. there is" should be "Since there
   is no--.
Column 6, line 30, "2" should be --2'--.
Column 6, line 32, "4" should be --4'--.
Column 7, line 8, "water" should be --washer--.
```

Signed and sealed this 15th day of August 1972.

(SEAL)
Attest:

EDWARD M. FLETCHER, JR.
Attesting Officer

ROBERT GOTTSCHALK
Commissioner of Patents